(12) United States Patent
Xie (10) Patent No.: US 10,270,385 B2
(45) Date of Patent: Apr. 23, 2019

(54) CONNECTING SOLAR MODULES

(71) Applicant: Jason Sen Xie, Fremont, CA (US)

(72) Inventor: Jason Sen Xie, Fremont, CA (US)

( * ) Notice: Subject to any disclaimer, the term of this patent is extended or adjusted under 35 U.S.C. 154(b) by 0 days.

(21) Appl. No.: 15/891,315

(22) Filed: Feb. 7, 2018

(65) Prior Publication Data

US 2018/0167026 A1 Jun. 14, 2018

Related U.S. Application Data (63) Continuation-in-part of application No. 15/162,156, filed on May 23, 2016, now Pat. No. 9,923,511.

(60) Provisional application No. 62/584,818, filed on Nov. 12, 2017, provisional application No. 62/200,521, filed on Aug. 3, 2015, provisional application No. 62/272,092, filed on Dec. 29, 2015.

(51) Int. Cl.
| | | |
|---|---|---|
| *H02S 30/10* | (2014.01) | |
| *H02S 20/23* | (2014.01) | |
| *F24S 25/00* | (2018.01) | |
| *F24S 25/65* | (2018.01) | |
| *H02S 30/00* | (2014.01) | |
| *H01R 4/64* | (2006.01) | |

(52) U.S. Cl.
CPC .............. *H02S 30/10* (2014.12); *F24S 25/00* (2018.05); *F24S 25/65* (2018.05); *H02S 20/23* (2014.12); *H02S 30/00* (2013.01); *H01R 4/64* (2013.01); *Y02B 10/12* (2013.01)

(58) Field of Classification Search
CPC ......... H02S 30/10; H02S 20/23; Y02B 10/12; H01R 4/64; F24S 2025/6003; F24S 2025/6005; F24S 2025/6006; F24S 25/61; F24S 25/63
See application file for complete search history.

(56) References Cited

U.S. PATENT DOCUMENTS

| | | | | |
|---|---|---|---|---|
| 9,010,041 | B2 * | 4/2015 | Danning | B23P 11/00 |
| | | | | 52/173.3 |
| 9,431,953 | B2 * | 8/2016 | Stearns | H02S 20/23 |
| 9,473,064 | B2 * | 10/2016 | Schaefer | F16M 13/022 |
| 9,599,280 | B2 * | 3/2017 | West | F16M 13/02 |
| 9,985,575 | B2 * | 5/2018 | Stearns | H02S 20/23 |
| 10,014,818 | B2 * | 7/2018 | Stearns | H02S 20/23 |
| 10,097,132 | B2 * | 10/2018 | Stearns | H02S 20/23 |

(Continued)

*Primary Examiner* — Adriana Figueroa
(74) *Attorney, Agent, or Firm* — Douglas L. Weller (57) ABSTRACT

A module connector connects a first solar module to a second solar module. A first part of the module connector includes a top component having a top flange that is slightly tilted lower at a tip of the top flange. A bottom component has a hook-shaped end that is shaped to slide and enclose an inner side of a module frame bottom of the first solar module. A first fastener is used to secure the first solar panel module between the top component and the bottom component. A second part of the module connector includes a top component having a top flange that is slightly tilted lower at a tip of the top flange. A bottom component of the second part has a hook-shaped end that is shaped to slide and enclose an inner side of a module frame bottom of the second solar module. A second fastener is used to secure the second solar panel module between the top component and the bottom component of the second part. A third fastener fastens the top component of the first part to the bottom component of the second part.

14 Claims, 13 Drawing Sheets

(56) References Cited

U.S. PATENT DOCUMENTS

| | | | | |
|---|---|---|---|---|
| 2012/0298817 | A1* | 11/2012 | West | H02S 20/00 248/220.22 |
| 2016/0268958 | A1* | 9/2016 | Wildes | H02S 20/23 |
| 2016/0352283 | A1* | 12/2016 | Stearns | H02S 20/23 |
| 2017/0366131 | A1* | 12/2017 | Stearns | F24S 25/65 |

* cited by examiner

CONNECTING SOLAR MODULES

CROSS-REFERENCE TO RELATED APPLICATIONS

This application claims the benefit of claims the benefit of U.S. Provisional Patent Application No. 62/584,818 filed Nov. 12, 2017, the entire disclosure of which is incorporated herein by reference and claims the benefit U.S. patent application Ser. No. 15/162,156 filed May 23, 2016, the entire disclosure of which is incorporated herein by reference. Patent application Ser. No. 15/162,156 claims the benefit of U.S. Provisional Patent Application No. 62/200,521 filed Aug. 3, 2015 and claims the benefit of U.S. Provisional Patent Application No. 62/272,092 filed Dec. 29, 2015.

BACKGROUND

Solar modules, such as photovoltaic solar modules and solar thermal modules, are often installed on the ground, on a roof or on other structures. It is common to install the solar modules using a pair of rails secured to a rooftop or other structure. For example, solar modules are secured to rails with clamps. The long rails required for such solar modules can increase installation cost due to transportation and material cost. Further, in such systems clamps of various sizes are required to accommodate solar modules with different frame thickness. Additional mounting and securing methods include rail-less or rail-free solar mounting methods, where clamps are used to secure solar modules to each other and to a roof. The roof attachment usually includes a clamp in order to connect modules to each other and to secure roof attachment to modules. Since the clamp and roof attachment provide the dual functions of connecting modules together and securing modules to the roof, the clamp may not be at the optimal position to connect two modules together and the roof attachments may not be at the optimal position where roof attachment provides maximum support and attachment security to the solar modules.

Often a rooftop is not precisely leveled due to age of the roof structure or roofing materials. This requires attachment and clamping devices to be height adjustable in order to accommodate roof conditions. Due to the required complexity, roof attachment and clamping can be expensive and difficult to install. It can also be difficult to precisely position a module frame and roof attachment.

Roof attachments are usually secured to a roof before modules are installed. Since a module frame need to be installed precisely next to previously installed modules, the roof attachment that is previously installed needs to be at the desired position precisely. This is sometimes difficult and or impossible to accomplish; therefore, roof attachments must be adjustable laterally, adding complexity and expensive to roof attachments.

DESCRIPTION OF THE EMBODIMENTS

In the present application, a module connector and a module bracket are used to separate solar module connection from roof attachment supporting solar modules. A module connector connects two adjacent solar modules. A module bracket is attached to a solar module and has an embedded bolt through which a roof attachment or other component can be attached to a solar module.

Each module connector has a first part and a second part that working together connect two modules. The first part can be attached to a first solar module and the second part to a second solar module. This allows two adjacent solar modules to be connected with a bolt through the first part and the second part.

The first part and the second part each have two components, a top component and a bottom component. The top component has a top flange that is slightly tilted lower at the tip. The bottom component has a hook-shaped end that can slide and enclose the inner side of the module frame bottom. When the two components are mounted to the top and the bottom of a solar module and tightened with a bolt, the part is secured to the module.

One of the two parts has a wider top component with a bolt hole. The other part has a wider lower bottom component with a threaded bolt hole. When the module with first part attached is moved next to the module with second part attached, the first part can be connected with the second part through the first wider top component and the second wider bottom component with a bolt. Therefore, the two modules are connected.

The module bracket has two components: a top component and a bottom component. The top component has top flange that is slightly tilted lower at the tip and also has an embedded bolt. The bottom component has hook-shaped end that can slide and enclose the inner side of the module frame bottom. When the two components are tightened with two bolts, the module bracket is secured to the module. Through an embedded bolt, roof attachment and other mounting component can be attached to the module.

Figure 1:
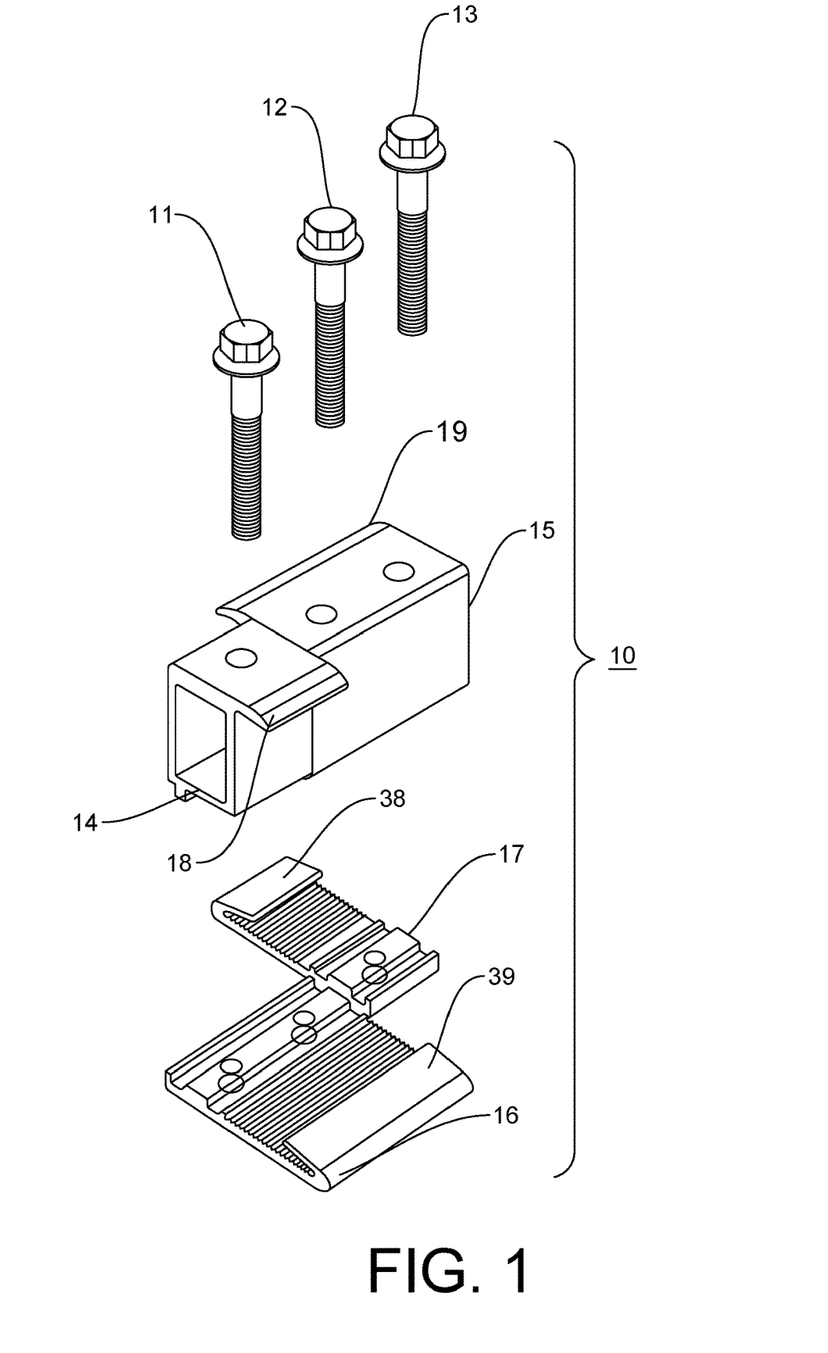
FIG. 1 is a perspective view of a module connector before assembly in accordance with an implementation.
Figure 2:
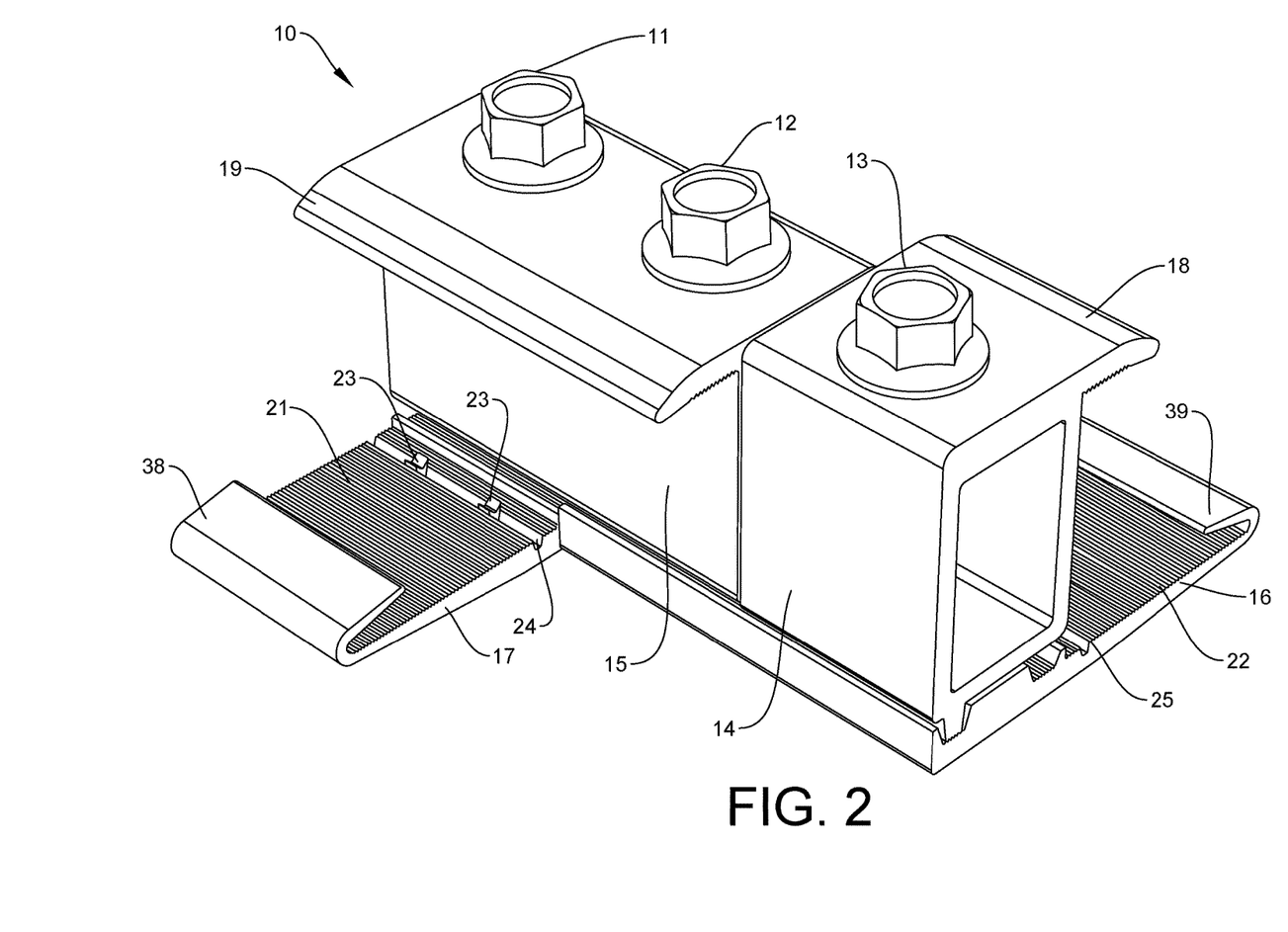
FIG. 2 is a perspective view of a connector after assembly in accordance with an implementation.
Figure 3:
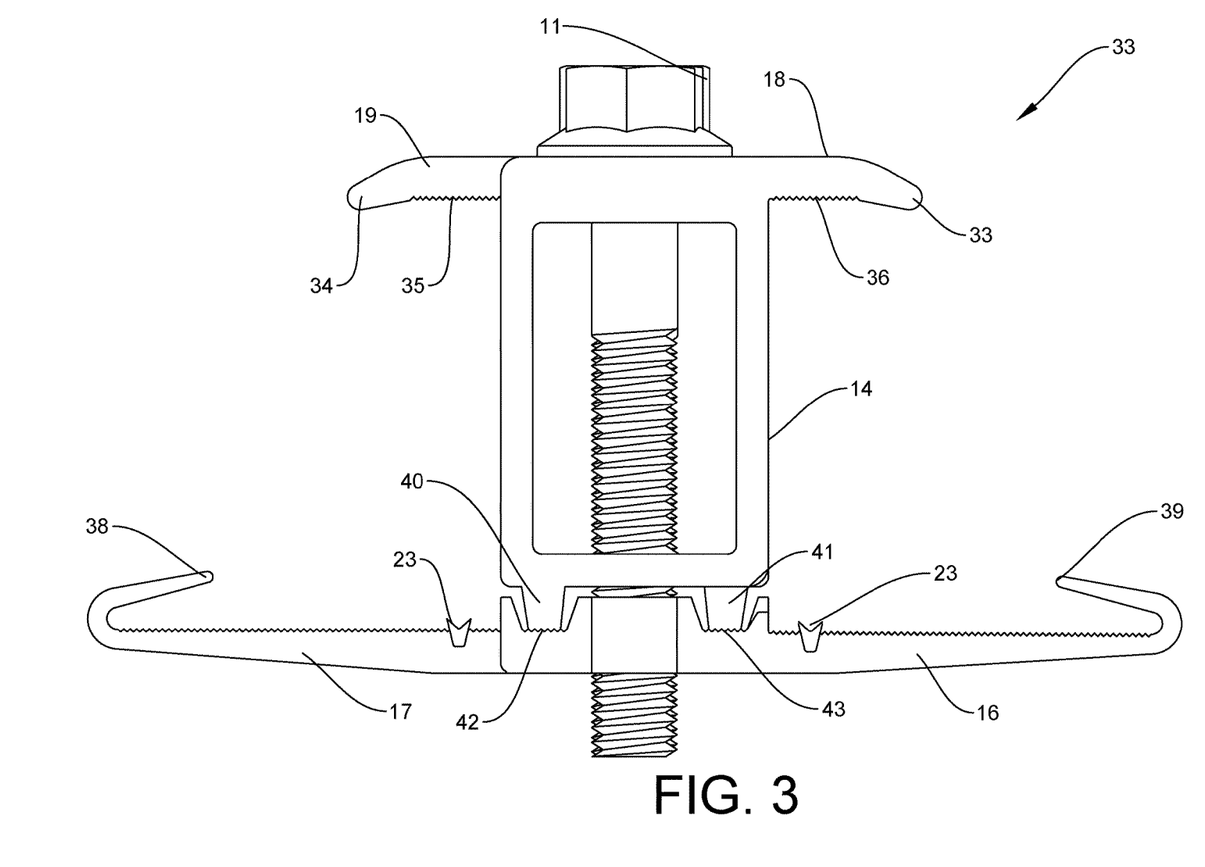
FIG. 3 is a section view of a module connector after assembly in accordance with an implementation.
Figure 4:
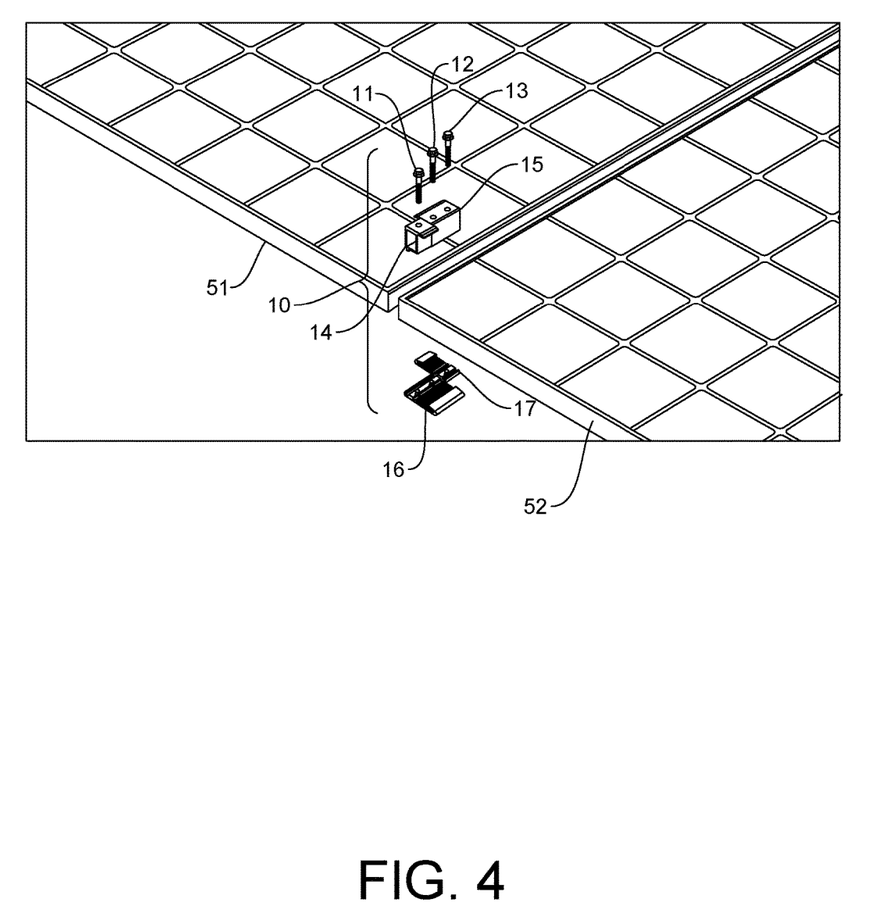
FIG. 4 is a perspective view of a module connector and two solar modules before assembly in accordance with an implementation.
Figure 5:
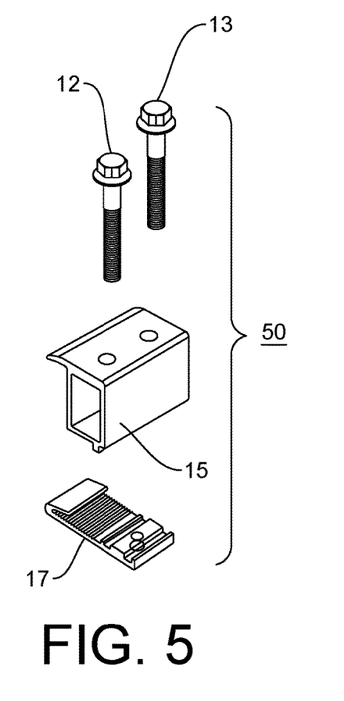
FIG. 5 is a perspective view of a first part of a module connector before assembly in accordance with an implementation.
Figure 8:
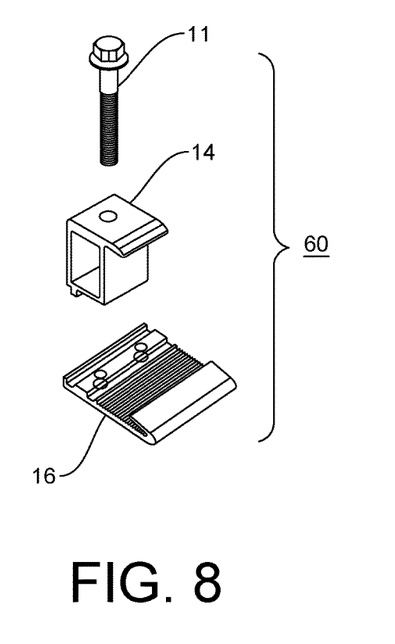
FIG. 8 is a perspective view of a second part of a module connector before assembly in accordance with an implementation.

FIG. 1, FIG. 2, FIG. 3 and FIG. 4 show a module connector 10 and illustrate how module connector 10 connects a first solar module 51 to a second solar module 52. Module connector 10 has a first part 50, as shown in FIG. 5, and a second part 60, as shown in FIG. 8. As shown in FIG. 4, first part 50 is attached to first solar module 51 and second part 60 is attached to second solar module 52 in order to connect first solar module 51 to second solar module 52.

Figure 6:
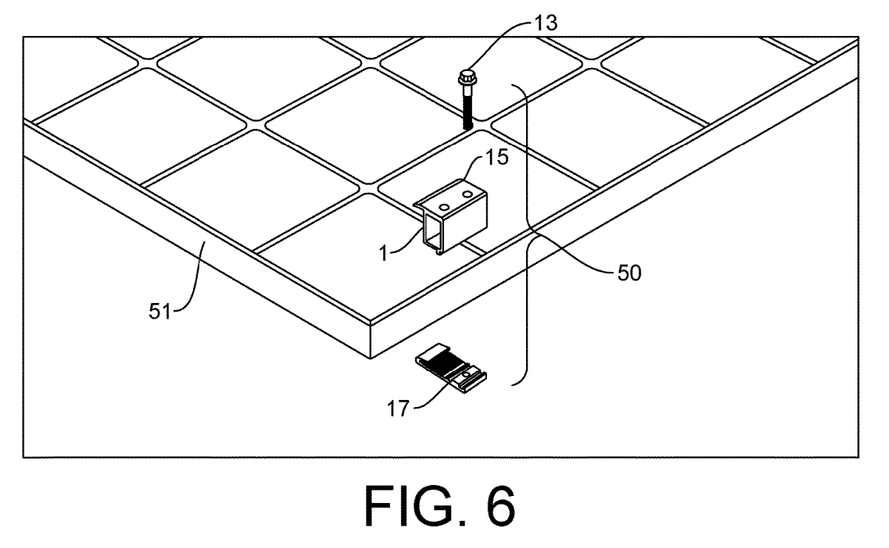
FIG. 6 is a perspective view of a first part of a module connector with a solar module before assembly in accordance with an implementation.
Figure 7:
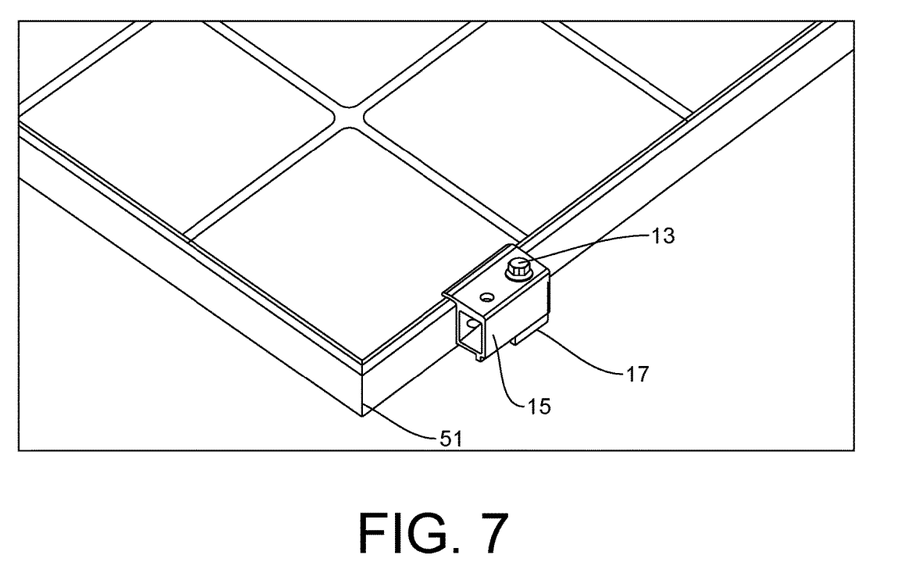
FIG. 7 is a perspective view of a first part of a module connector with a solar module after assembly in accordance with an implementation.

First part 50 has a top component 15 and bottom component 17. Top component 15 has a top flange 19 that is slightly tilted lower at a tip 34, as shown in FIG. 3. Bottom component 17 has a hook-shaped end 38 that can slide and enclose an inner side of a module frame bottom of first solar module 51. A bolt 13 is used to secure first solar panel module 51 between top component 15 and bottom component 17. FIG. 5, FIG. 6 and FIG. 7, show first part 50 and illustrate how first part 50 is connected to solar module 51. As shown in FIG. 2, bonding pins 23 are placed in a slot 24 of bottom component 17.

Figure 20:
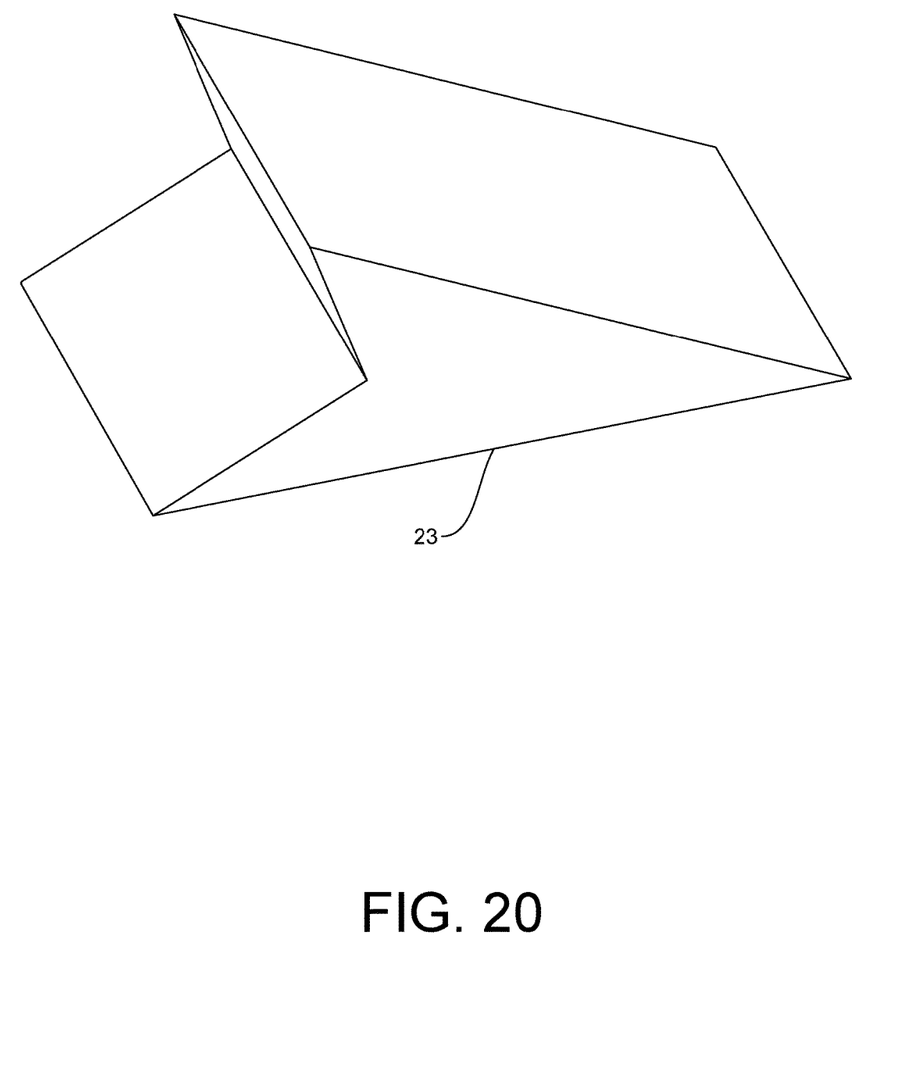
FIG. 20 shows a bonding pin in accordance with an implementation.

Bonding pins 23 placed in a slot 24 are used to bond first part 50 with first module 51 electrically when first part 50 is attached to first solar module 51. For example, each of bonding pins 23 is composed of stainless steel and has sharp teeth facing outward. Additional details of bonding pins 23 are shown in FIG. 20. Teeth 21 on a top surface of bottom component 17 and teeth 35 in top flange 19, as shown in FIG. 3, prevent movement or slippage. A support 41 in contact with bottom component 17 at a location 43 provides support and leverage for connection between top component 15 and bottom component 17, as shown in FIG. 3.

Figure 9:
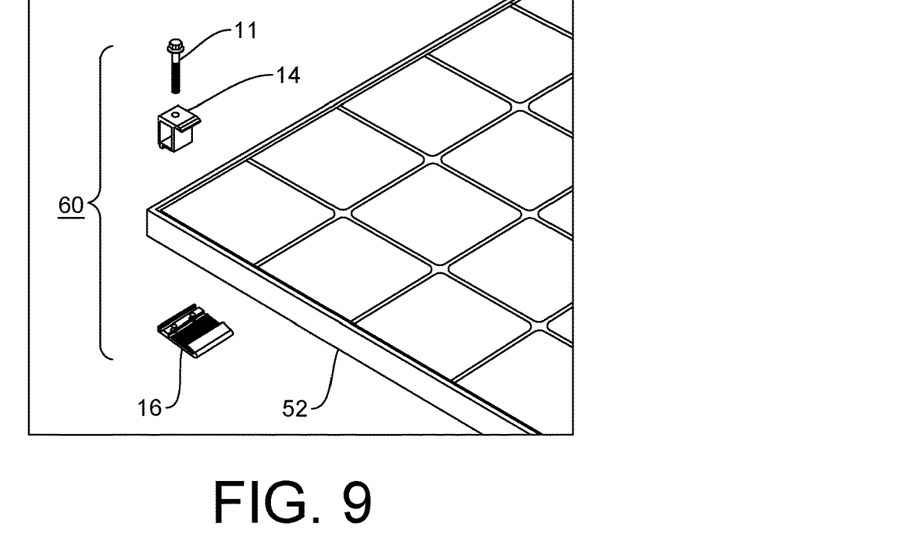
FIG. 9 is a perspective view of a second part of a module connector with a solar module before assembly in accordance with an implementation.
Figure 10:
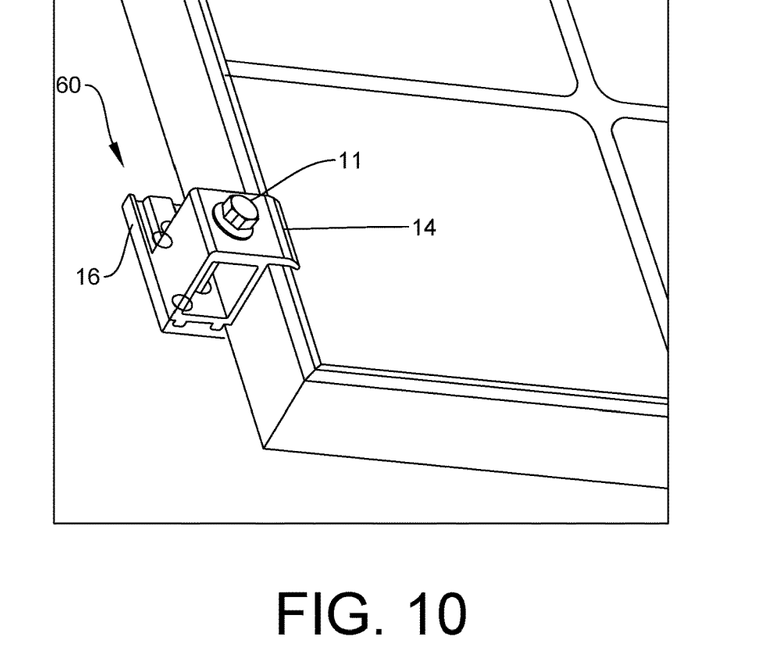
FIG. 10 is a perspective view of a second part of a module connector with a solar module after assembly in accordance with an implementation.

Second part 60 has a top component 14 and a bottom component 16. Top component 14 has a top flange 18 that is slightly tilted lower at a tip 33 as shown in FIG. 3. Bottom component 16 has a hook-shaped end 39 that can slide and enclose an inner side of a module frame bottom of second solar module 52. A bolt 11 is used to secure second solar panel module 52 between top component 14 and bottom component 16. FIG. 8, FIG. 9 and FIG. 10, shows second part 60 and illustrates how second part 60 is connected to solar module 52.

Bonding pins 23 placed in a slot 25 are used to bond second part 60 with second module 52 electrically when second part 60 is attached to second solar module 52. Teeth 22 on a top surface of bottom component 16 and teeth 36 in top flange 18, as shown in FIG. 3, prevent movement or slippage. A support 40 in contact with bottom component 16 at a location 42 provides support and leverage for connection between top component 14 and bottom component 16, as shown in FIG. 3.

Once first part 50 is secured to first solar panel module 51 and second part 60 is secured to second solar panel module 52, a bolt 12 is used to secure together first solar panel module 51 and second solar panel module 52.

Figure 11:
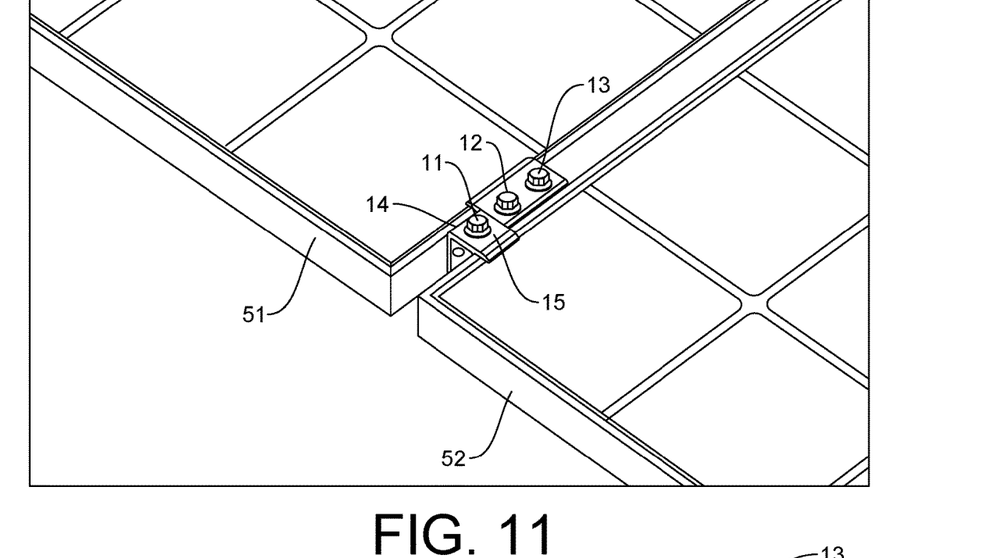
FIG. 11 is a perspective view of first and second parts of a module connector with two adjacent solar modules connected after assembly in accordance with an implementation.
Figure 12:
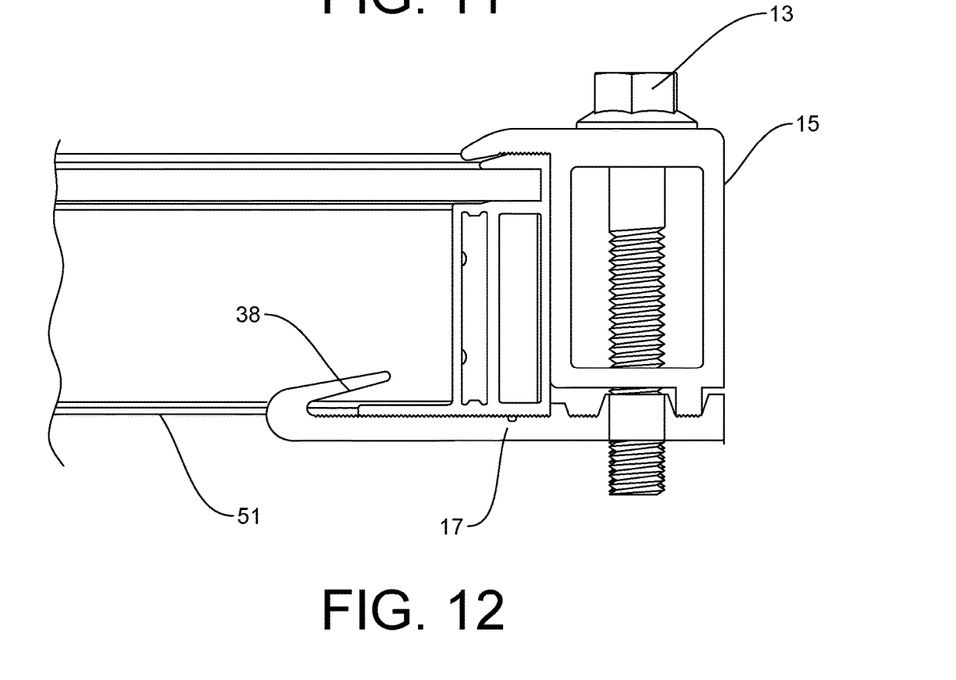
FIG. 12 is a section view of a first part of a module connector with a solar module after assembly in accordance with an implementation.
Figure 13:
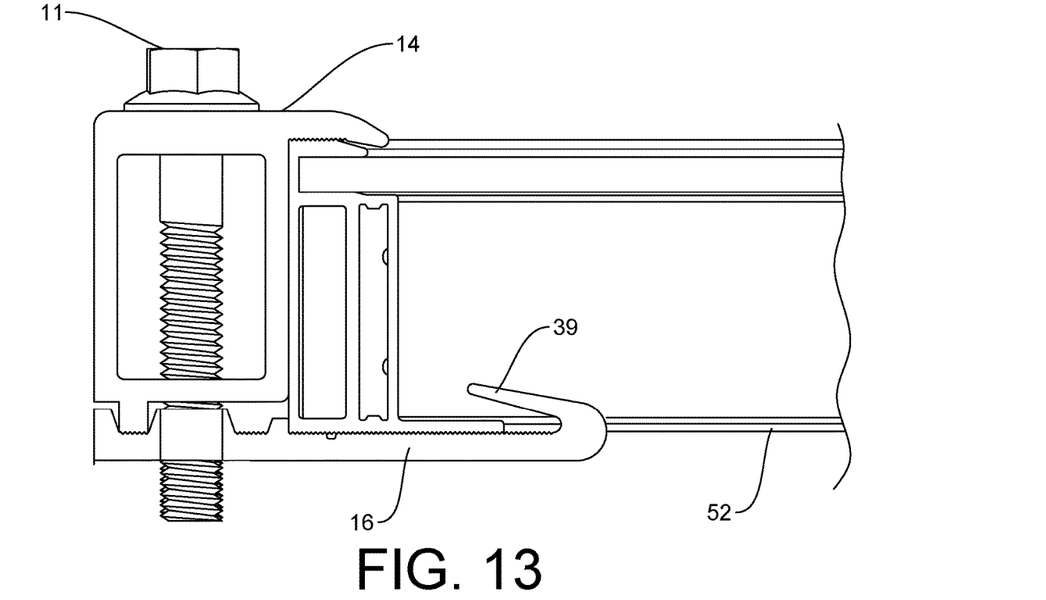
FIG. 13 is a section view of a second part of a module connector with a solar module after assembly in accordance with an implementation.

Top component 15 of first part 50 is wider than top component 14 of second part 60, allowing top component 15 of first part 50 to accommodate an additional bolt hole. Bottom component 16 of second part 60 is wider than bottom component 17 of first part 50, allowing bottom component 16 of second part 60 to accommodate an additional threaded bolt hole. Bolt 12 enters the additional bolt hole accommodated by top component 15 of first part 50 and screws into the additional threaded bolt hole accommodated by bottom component 16 to allow secure connection of first part 50 to second part 60 and thus provides secure connection between first solar panel module 51 and second solar panel module 52. FIG. 11, FIG. 12 and FIG. 13 illustrate the secure connection of first part 50 to first solar panel module 51, the secure connection of second part 60 to second solar panel module 52 and the secure connection of second part 60 to first part 50.

Figure 14:
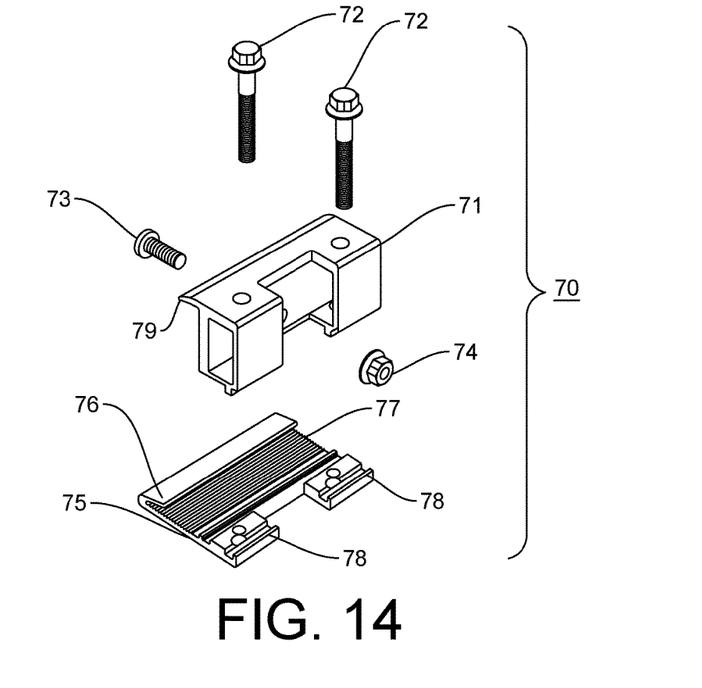
FIG. 14 is a perspective view of a module bracket before assembly in accordance with an implementation.

FIG. 14 shows a module bracket 70 having a top component 71 and a bottom component 75. Top component 71 has top flange 79 that is slightly tilted lower at the tip Bottom component 75 has hook-shaped end 76 that can slide and enclose an inner side of a module frame bottom. Slots 78 are used to correctly position attachment of top component 71 to bottom component 75. Teeth 77 are used to secure an attached solar module panel and prevent moving or slipping.

Figure 15:
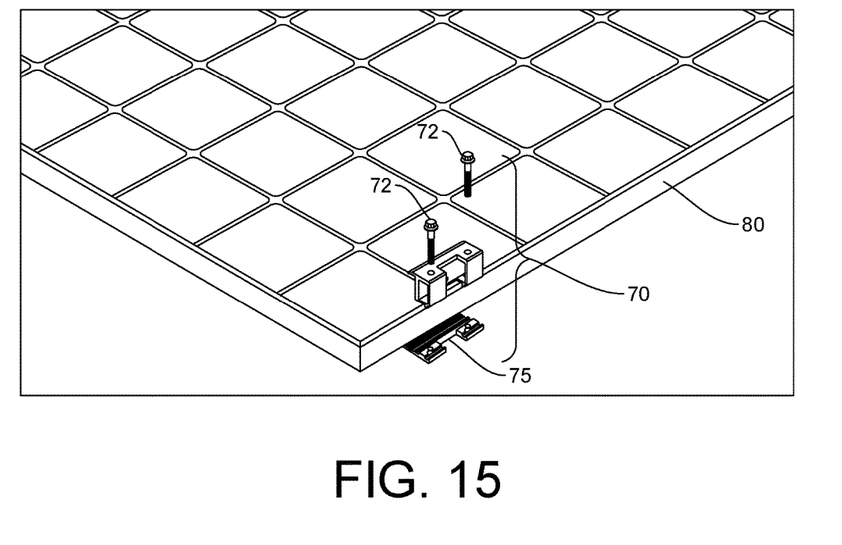
FIG. 15 is a perspective view of a module bracket with a solar module before assembly in accordance with an implementation.
Figure 16:
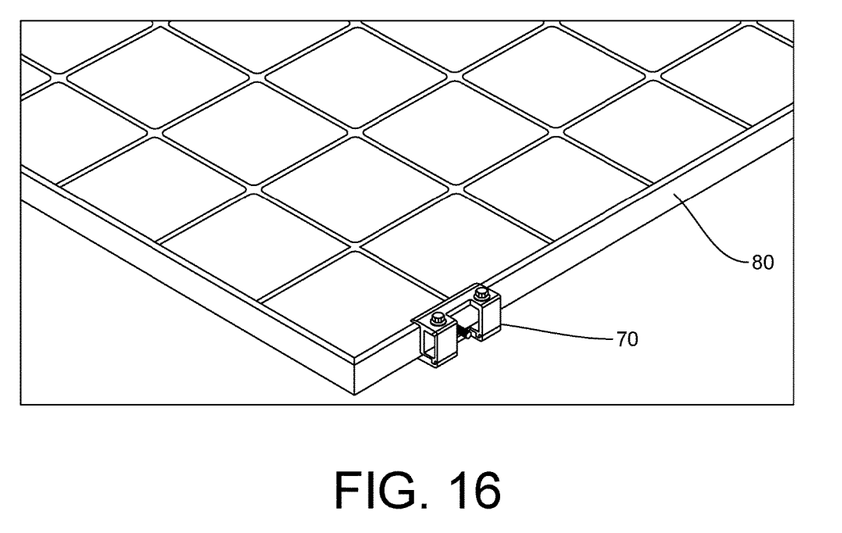
FIG. 16 is a perspective view of a module bracket with a solar module after assembly in accordance with an implementation.
Figure 17:
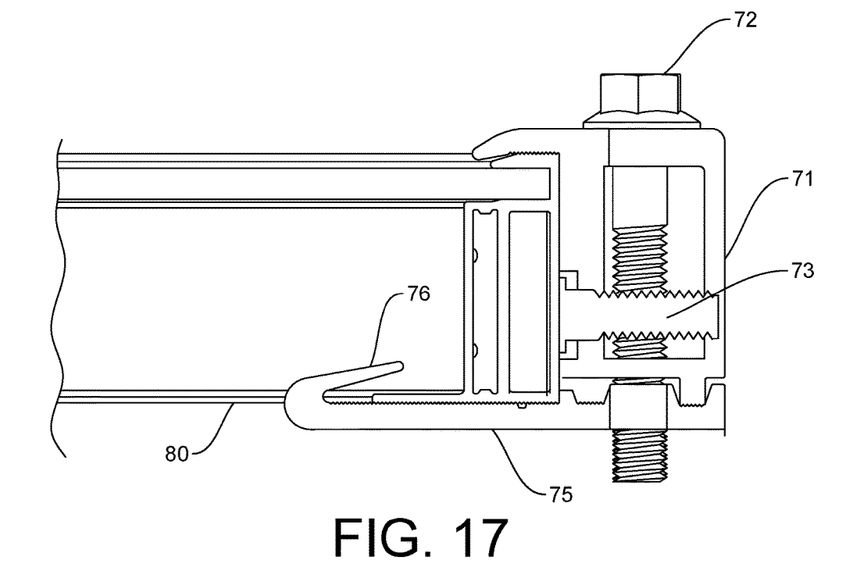
FIG. 17 is a section view of a module bracket with a solar module after assembly in accordance with an implementation.
Figure 18:
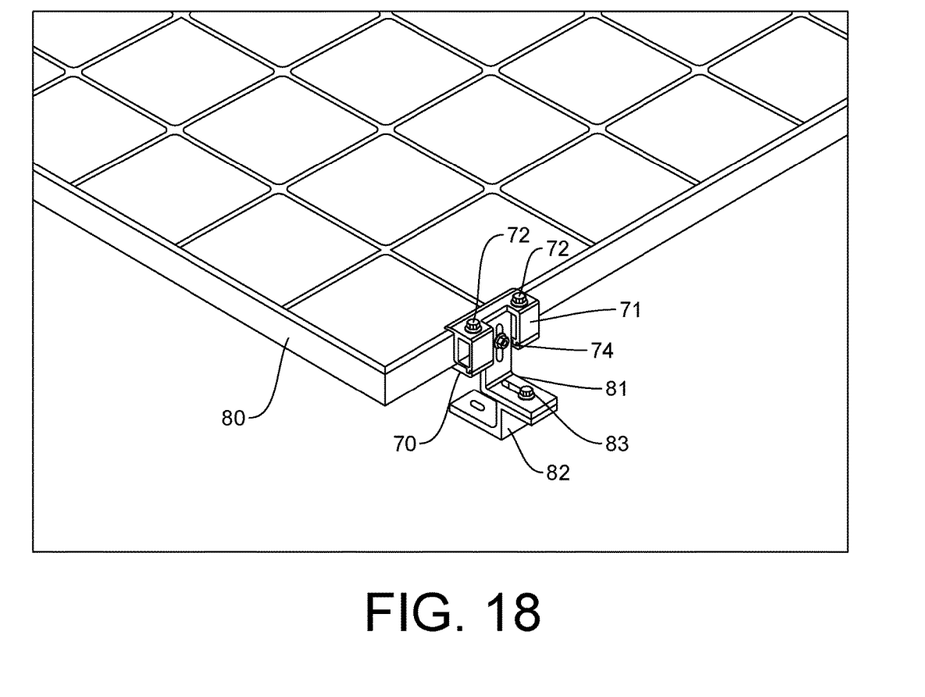
FIG. 18 is a perspective view of a module bracket with a solar module and a roof attachment after assembly in accordance with an implementation.

Bolts 72 are used to secure top component 71 and bottom component 75 to a solar module panel 80, as illustrated in FIG. 15 and FIG. 16. Once module bracket 70 is secured to module panel 18, bolt 73 and nut 74 can be used to attach to a roof through use of a roof attachment system of brackets that may include one or more brackets. This is illustrated in FIG. 18 where bolt 73 and nut 74 are used to attach module bracket 70 to a roof attachment system of brackets that includes a bracket 81 which through a bolt 83 is attached to another bracket 82. For example, bracket 82 is configured to attach to a roof.

Figure 19:
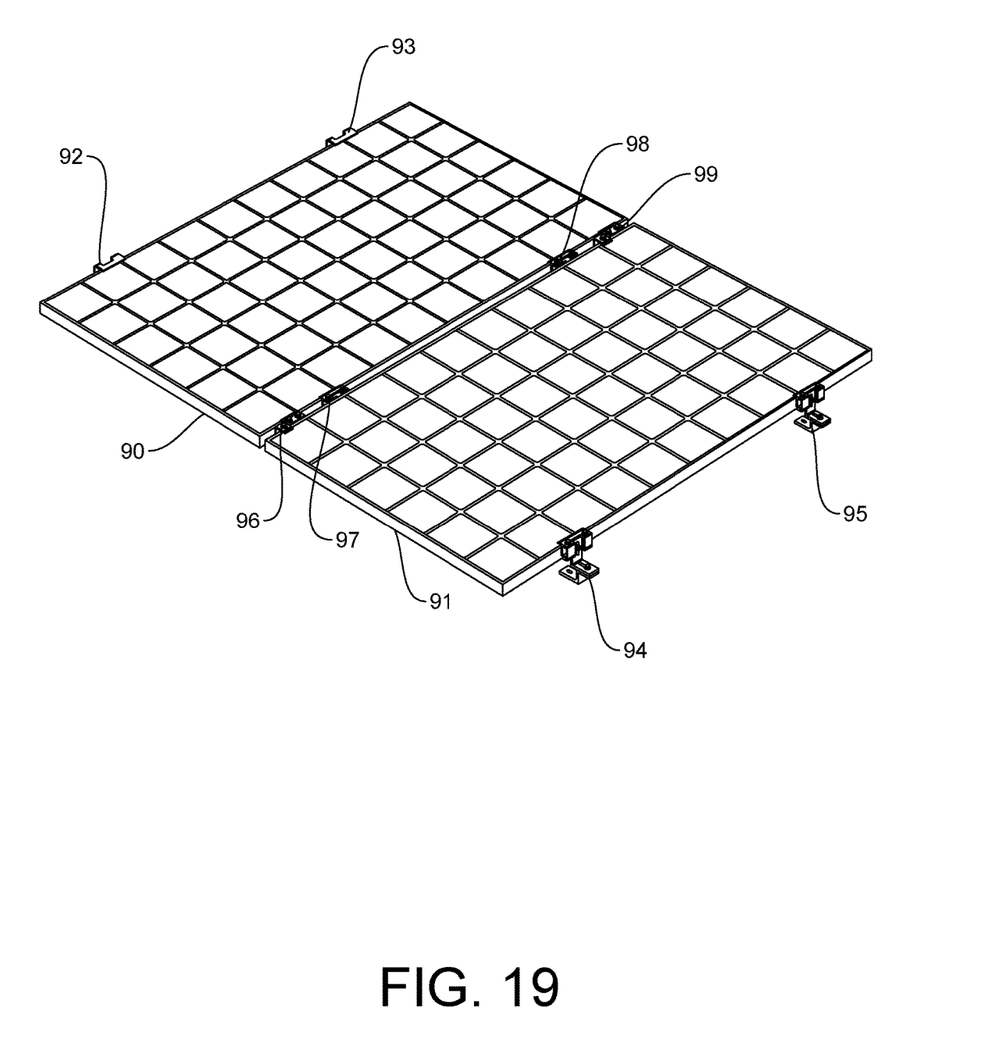
FIG. 19 is a perspective view of two solar modules connected and mounted with rail-less solar mounting system with module connectors, module brackets and roof attachments in accordance with an implementation.

FIG. 19 shows a complete system where a solar module panel 90 is attached to a solar module panel 91 through use of a module connector 96 and a module connector 99, which are all similar to module connector 10. The connected solar module panel 90 and solar module panel 91 may then be attached to a roof using a module bracket 92, a module bracket 93, a module bracket 97, a module bracket 98, a module bracket 94 and a module bracket 95, which are all similar to module bracket 70.

The rail-less solar mounting system described herein reduces the number of mounting components, simplifies solar installation procedure and reduces solar installation time and cost. By using the present invention, a solar contractor can install solar projects quickly and easily at reduced cost.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A module connector that connects a first solar module to a second solar module, the module connector comprising:
   a first part, including:
      a top component having a top flange that is slightly tilted lower at a tip of the top flange,
      a bottom component having a hook-shaped end that is shaped to slide and enclose an inner side of a module frame bottom of the first solar module, and
      a first fastener used to secure the first solar panel module between the top component and the bottom component;
   a second part, including:
      a top component having a top flange that is slightly tilted lower at a tip of the top flange,
      a bottom component having a hook-shaped end that is shaped to slide and enclose an inner side of a module frame bottom of the second solar module, and
      a second fastener used to secure the second solar panel module between the top component and the bottom component of the second part; and,
   a third fastener that fastens the top component of the first part to the bottom component of the second part.

2. A module connector as in claim 1 wherein the first fastener is a bolt that extends through a hole in the top component of the first part and screws into a threaded hole within the bottom component of the first part.

3. A module connector as in claim 2 wherein the second fastener is a bolt that extends through a hole in the top component of the second part and screws into a threaded hole within the bottom component of the second part.

4. A module connector as in claim 3 wherein the third fastener is a bolt that extends through a hole in the top component of the first part and screws into a threaded hole within the bottom component of the second part.

5. A module connector as in claim 2 wherein the third fastener is a bolt that extends through a hole in the top component of the first part and screws into a threaded hole within the bottom component of the second part.

6. A module connector as in claim 1 wherein the third fastener is a bolt that extends through a hole in the top component of the first part and screws into a threaded hole within the bottom component of the second part.

7. A module connector as in claim 1:
   wherein the top component of the first part is wider than the top component of the second part;
   wherein the bottom component of the second part is wider than the bottom component of the first part; and,
   wherein the third fastener is a bolt that extends through a hole in the top component of the first part and screws into a threaded hole within the bottom component of the second part.

8. An attachment system that connects a first solar module and a second solar module to each other and to a roof, the attachment system comprising:
   a plurality of module connectors that connects the first solar module to the second solar module, each module connector in the plurality of module connectors comprising:
      a first part, including:
         a top component having a top flange that is slightly tilted lower at a tip of the top flange,
         a bottom component having a hook-shaped end that is shaped to slide and enclose an inner side of a module frame bottom of the first solar module, and
         a first fastener used to secure the first solar panel module between the top component and the bottom component,
      a second part, including:
         a top component having a top flange that is slightly tilted lower at a tip of the top flange,
         a bottom component having a hook-shaped end that is shaped to slide and enclose an inner side of a module frame bottom of the second solar module, and
         a second fastener used to secure the second solar panel module between the top component and the bottom component of the second part, and
      a third fastener that fastens the top component of the first part to the bottom component of the second part; and,
   a plurality of module brackets that connects the first solar module and the second solar module to the roof.

9. An attachment system as in claim 8 wherein the first fastener is a bolt that extends through a hole in the top component of the first part and screws into a threaded hole within the bottom component of the first part.

10. A module connector as in claim 9 wherein the second fastener is a bolt that extends through a hole in the top component of the second part and screws into a threaded hole within the bottom component of the second part.

11. An attachment system as in claim 8 wherein the third fastener is a bolt that extends through a hole in the top component of the first part and screws into a threaded hole within the bottom component of the second part.

12. An attachment system as in claim 8:
    wherein the top component of the first part is wider than the top component of the second part;
    wherein the bottom component of the second part is wider than the bottom component of the first part; and,
    wherein the third fastener is a bolt that extends through a hole in the top component of the first part and screws into a threaded hole within the bottom component of the second part.

13. An attachment system as in claim 8, wherein each module bracket in the plurality of module brackets comprises:
    a top component that has a top flange that is slightly tilted lower at a tip of the top flange with the top section having a left section, a right section and a middle section located between the left section and the right section;
    a bottom component that has hook-shaped end that can slide and enclose an inner side of a module frame bottom of the solar module;
    a first fastener that secures the left section and bottom component of the module bracket to the solar module;
    a second fastener that secures the right section and bottom component of the module bracket to the solar module; and,
    a third fastener that secures the middle section to a roof attachment system of brackets, the roof attachment system of brackets being configured to attach to the roof.

14. An attachment system as in claim 13 wherein the third fastener of the module bracket is a bolt that extends through a hole in the middle section, through an opening in a bracket of the roof attachment system of brackets and screws into a nut.

* * * * *